(12) United States Patent  (10) Patent No.: US 9,047,681 B2
Choi et al.  (45) Date of Patent: Jun. 2, 2015

(54) DEPTH IMAGE CONVERSION APPARATUS AND METHOD

(75) Inventors: Ouk Choi, Yongin-si (KR); Hwa Sup Lim, Hwaseong-si (KR); Kee Chang Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 545 days.

(21) Appl. No.: 13/466,573

(22) Filed: May 8, 2012

(65) Prior Publication Data

US 2013/0011046 A1 Jan. 10, 2013

Related U.S. Application Data

(60) Provisional application No. 61/505,218, filed on Jul. 7, 2011.

(30) Foreign Application Priority Data

Aug. 25, 2011 (KR) .......................... 10-2011-0084918

(51) Int. Cl.
*G06K 9/00* (2006.01)
*G06T 3/40* (2006.01)
*G06T 7/00* (2006.01)

(52) U.S. Cl.
CPC .............. *G06T 3/4007* (2013.01); *G06T 7/0051* (2013.01)

(58) Field of Classification Search
CPC ................ G06T 3/4053; G06T 7/0051; G06T 2207/10028; G06T 2207/20028; H04N 13/0022; H04N 13/0271; H04N 2013/008
USPC ................................................. 382/154, 251
See application file for complete search history.

(56) References Cited

U.S. PATENT DOCUMENTS

2010/0239187 A1 9/2010 Yea et al.
2014/0146139 A1* 5/2014 Schwartz et al. ............... 348/43

FOREIGN PATENT DOCUMENTS

KR 10-2008-0102826 11/2008
KR 10-2010-0008677 1/2010
KR 10-2010-0132189 12/2010

OTHER PUBLICATIONS

Wu et al., Improved 3D depth image estimation algorithm for visual camera [on-line], Oct. 17-19, 2009 [retrieved Jan. 16, 2015], 2nd International Congress on Image and Signal Processing, 2009, 4 total pages. Retrieved from Internet: http://ieeexplore.ieee.org/xpls/abs_all.jsp?arnumber=5305324&tag=1.*

(Continued)

*Primary Examiner* — Matthew Bella
*Assistant Examiner* — Dennis Rosario
(74) *Attorney, Agent, or Firm* — Staas & Halsey LLP

(57) ABSTRACT

Provided are an apparatus and method for converting a low-resolution depth image to a depth image having a resolution identical to a resolution of a high-resolution color image. The depth image conversion apparatus may generate a discrete depth image by quantizing a depth value of an up-sampled depth image, estimate a high-resolution discrete depth image by optimizing an objective functions of the discrete depth image based on the high-resolution color image and an up-sampled depth border, and convert the up-sampled depth image to a high-resolution depth image by filtering the up-sampled depth image when a difference between discrete depth values of neighboring pixels in the high-resolution discrete depth image is less than a predetermined threshold value.

26 Claims, 12 Drawing Sheets

(5 of 12 Drawing Sheet(s) Filed in Color)

(56) References Cited

OTHER PUBLICATIONS

Schuon et al., High-Quality Scanning Using Time-Of-Flight Depth Superresolution [on-line], Jun. 23-28, 2008 [retrived Jan. 16, 2015], IEEE Computer Society Conference on Computer Vision and Pattern Recognition Workshops, 2008, 7 total pages. Retrived from Internet: http://ieeexplore.ieee.org/xpls/abs_all.jsp?arnumber=4563171.*

* cited by examiner

LOW-RESOLUTION PIXEL k $D_k$: SET OF HIGH-RESOLUTION PIXELS CORRESPONDING TO LOW-RESOLUTION PIXEL k

DEPTH IMAGE CONVERSION APPARATUS AND METHOD

CROSS-REFERENCE TO RELATED APPLICATIONS

This application claims the benefit under 35 U.S.C. §119 (e) of U.S. Provisional Application No. 61/505,218, filed on Jul. 7, 2011, in the U.S. Patent and Trademark Office, and under 35 U.S.C. §119(a) of Korean Patent Application No. 10-2011-0084918, filed on Aug. 25, 2011, in the Korean Intellectual Property Office, the entire disclosures of which are hereby incorporated by reference.

BACKGROUND

1. Field

Example embodiments relate to an apparatus and method that may convert a low-resolution depth image to a depth image having a resolution identical to a resolution of a high-resolution color image.

2. Description of the Related Art

A Time-of-Flight (ToF) depth camera provides depth information of a scene in real time. However, a low sensitivity of a photodiode used as a pixel of the ToF depth camera causes an increase in a size of a pixel and thereby a decrease in resolution.

Additionally, since a currently commercialized depth camera fails to obtain color information, a separate color camera is necessary to obtain the color information for generating a three-dimensional (3D) model of a scene. Also, there is a need to geometrically calibrate the color camera and the depth camera. Further, a device, for example, a beam splitter, is also necessary to match viewpoints of the color camera and the depth camera. Accordingly, a size of a camera would be increased.

Recently, it has become possible to sense a color and a depth of a scene from the same viewpoint using a single camera, which is called a color-depth camera.

However, the color-depth camera uses four or sixteen color pixels as a single depth pixel by connecting the four or sixteen color pixels, due to a low sensitivity of a photodiode. Accordingly, there is a need to increase a resolution of a depth image to a level of a resolution of a color image, in order to generate, from a color-depth image, an image of a new viewpoint while maintaining the resolution of the color image.

SUMMARY

The foregoing and/or other aspects are achieved by providing an apparatus for converting a depth image, the apparatus including a discrete depth image generating unit to generate a discrete depth image by quantizing a depth value of an up-sampled depth image, a high-resolution discrete depth image estimating unit to estimate a high-resolution discrete depth image by optimizing an objective function of the discrete depth image based on a high-resolution color image and an up-sampled depth border, and an image conversion unit to convert the up-sampled depth image to a high-resolution depth image by filtering the up-sampled depth image when a difference between discrete depth values of neighboring pixels in the high-resolution discrete depth image is less than a predetermined threshold value.

The depth image conversion apparatus may further include an up-sampled depth image generating unit to generate the up-sampled depth image to a size identical to a size of the high-resolution depth image through an interpolation of a low-resolution depth image, a depth border extracting unit to extract neighboring pixels to be a depth border when a difference between depth values of neighboring pixels in the low-resolution depth image is greater than a predetermined threshold value, and an up-sampled depth border generating unit to generate the up-sampled depth border through an interpolation of the depth border.

The discrete depth image generating unit may include a disparity estimating unit to estimate an integer disparity value that is inversely proportional to a depth value of the up-sampled depth image, and proportional to a baseline length and a focal length between a viewpoint and a virtual viewpoint of a low-resolution depth image, and may use the integer disparity value as a discrete depth value of the discrete depth image.

The up-sampled depth border may include a border region and a border edge that are classified based on a difference between depth values of neighboring pixels. The high-resolution discrete depth image estimating unit may include an objective function computing unit to compute the objective function reflecting a data cost determined using different schemes depending on the border region of the discrete depth image and the border edge of the discrete depth image, and a discontinuity cost determined based on a difference between color values of the neighboring pixels, and a minimum value estimating unit to estimate a minimum value of the objective function.

The data cost may be determined based on a color-depth similarity weight between the neighboring pixels so that a difference between a discrete depth value of a pixel and a discrete depth value of a pixel corresponding to the pixel, among pixels in the high-resolution discrete depth image, may be less than a predetermined threshold value in the border region, and may be determined based on discrete depth values of the neighboring pixels, in the border edge.

The color-depth similarity weight may be determined based on a difference between color values of the neighboring pixels, a difference between depth values of the neighboring pixels, and a distance between the neighboring pixels.

The discontinuity cost may be determined based on a difference between color values of the neighboring pixels, and a difference between locations of the neighboring pixels so that a difference between discrete depth values of the neighboring pixels may also be modest when the difference between the color values of the neighboring pixels is modest.

The minimum value estimating unit may estimate a discrete depth value of the high-resolution discrete depth image, using an algorithm for estimating the minimum value of the objective function when discrete depth values of the neighboring pixels are discontinuous.

The image conversion unit may include a filtering unit to perform filtering by respectively applying different weights to a pixel corresponding to a border region of the up-sampled depth border, and to a pixel corresponding to a border edge and a flat region, in the up-sampled depth image.

The filtering unit may apply, to the pixel corresponding to the border region, a weight determined based on a difference between discrete depth values of the neighboring pixels, a difference between color values of the neighboring pixels, a difference between depth values of the neighboring pixels, and a difference between locations of the neighboring pixels, and may apply, to the pixel corresponding to the border edge and the flat region, a weight determined based on a difference between depth values of neighboring pixels, and a difference between locations of the neighboring pixels.

The image conversion unit may further include an adjusting unit to adjust a depth value of the filtered pixel based on a low-high resolution depth continuity.

The low-high resolution depth continuity may correspond to a continuity between the depth value of the filtered pixel, and a depth value of a pixel, corresponding to the filtered pixel, in a low-resolution depth image.

The image conversion unit may further include a feedback processing unit to feed back the pixel of which the depth value is adjusted, as an input value of the filtering unit.

The image conversion unit may simultaneously perform filtering by applying different weights to a pixel corresponding to a border region of the up-sampled depth border, and to a pixel corresponding to a border edge and a flat region, in the up-sampled depth image, and may adjust a depth value of the filtered pixel based on a low-high resolution depth continuity.

The foregoing and/or other aspects are also achieved by providing a method of converting a depth image, the method including generating a discrete depth image by quantizing a depth value of an up-sampled depth image, estimating a high-resolution discrete depth image by inputting the discrete depth image, and optimizing an objective function of the discrete depth image based on a high-resolution color image and an up-sampled depth border, and converting the up-sampled depth image to a high-resolution depth image by filtering the up-sampled depth image when a difference between discrete depth values of neighboring pixels in the high-resolution discrete depth image is less than a predetermined threshold value.

The depth image conversion method may further include generating the up-sampled depth image to a size identical to a size of the high-resolution depth image through an interpolation of a low-resolution depth image, extracting neighboring pixels to be a depth border when a difference between depth values of neighboring pixels in the low-resolution depth image is greater than a predetermined threshold value, and generating the up-sampled depth border through an interpolation of the depth border.

The generating of the discrete depth image may include estimating an integer disparity value that is inversely proportional to a depth value of the up-sampled depth image, and proportional to a baseline length and a focal length between a viewpoint and a virtual viewpoint of a low-resolution depth image, and the integer disparity value may be used as a discrete depth value of the discrete depth image.

The up-sampled depth border may include a border region and a border edge that are classified based on a difference between depth values of neighboring pixels. The estimating of the high-resolution discrete depth image may include computing the objective function reflecting a data cost determined using different schemes depending on the border region of the discrete depth image and the border edge of the discrete depth image, and a discontinuity cost determined based on a difference between color values of the neighboring pixels, and estimating a minimum value of the objective function.

The data cost may be determined based on a color-depth similarity weight between the neighboring pixels so that a difference between a discrete depth value of a pixel and a discrete depth value of a pixel corresponding to the pixel, among pixels in the high-resolution discrete depth image, may be less than a predetermined threshold value in the border region, and may be determined based on discrete depth values of the neighboring pixels, in the border edge.

The color-depth similarity weight may be determined based on a difference between color values of the neighboring pixels, a difference between depth values of the neighboring pixels, and a distance between the neighboring pixels.

The discontinuity cost may be determined based on a difference between color values of the neighboring pixels, and a difference between locations of the neighboring pixels so that a difference between discrete depth values of the neighboring pixels may also be modest when the difference between the color values of the neighboring pixels is modest.

The converting may include performing filtering by respectively applying different weights to a pixel corresponding to a border region of the up-sampled depth border, and to a pixel corresponding to a border edge and a flat region, in the up-sampled depth image.

The performing of the filtering may include applying, to the pixel corresponding to the border region, a weight determined based on a difference between discrete depth values of the neighboring pixels, a difference between color values of the neighboring pixels, a difference between depth values of the neighboring pixels, and a difference between locations of the neighboring pixels, and applying, to the pixel corresponding to the border edge and the flat region, a weight determined based on a difference between depth values of neighboring pixels, and a difference between locations of the neighboring pixels.

The converting may further include adjusting a depth value of the filtered pixel based on a low-high resolution depth continuity.

The generating of the discrete depth image may include generating a discrete depth image by quantizing a depth value of the high-resolution depth image.

According to example embodiments, a depth image having an accurate edge and a resolution identical to a resolution of a color image may be generated, by filtering an up-sampled depth image using a high-resolution discrete depth image, an up-sampled depth border, and a high-resolution color image.

According to example embodiments, a depth image having accurate target information and a resolution identical to a resolution of a color image may be generated, by adjusting a filtered depth image based on a depth continuity between a low-resolution depth image and a high-resolution depth image.

According to example embodiments, a converted high-resolution depth image may be used to generate a three-dimensional (3D) scene model having both color information and depth information.

According to example embodiments, a converted high-resolution depth image may be used as an input image for generating a multi-view image through color-depth-based image warping.

Additional aspects of embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects will become apparent and more readily appreciated from the following description of embodiments, taken in conjunction with the accompanying drawings of which.

DETAILED DESCRIPTION

Figure 1:
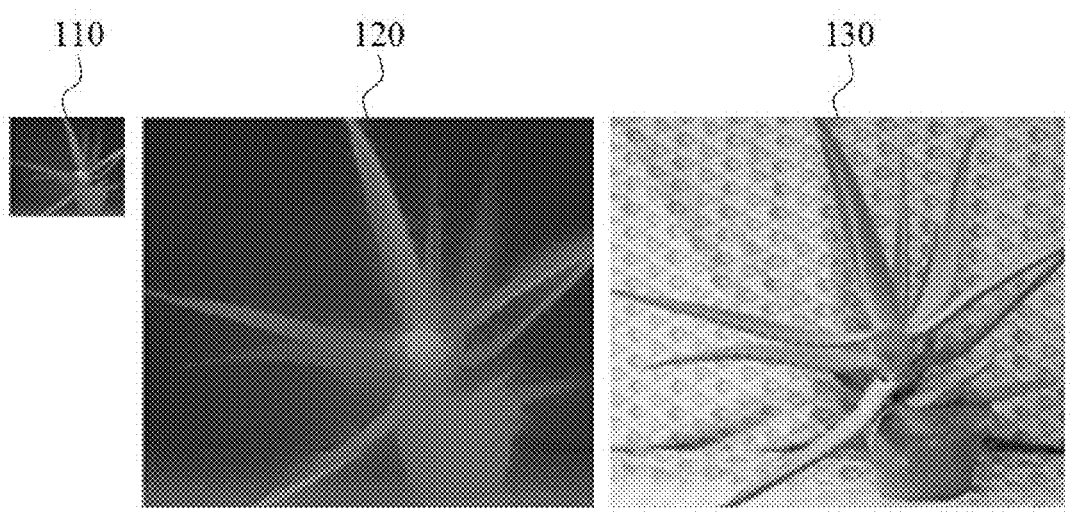
FIG. 1 illustrates a high-resolution depth image without a continuity with a low-resolution depth image according to example embodiments.

Reference will now be made in detail to embodiments, examples of which are illustrated in the accompanying drawings, wherein like reference numerals refer to the like elements throughout. Embodiments are described below to explain the present disclosure by referring to the figures. The patent or application file contains at least one drawing executed in color. Copies of this patent or patent application publication with color drawing(s) will be provided by the Office upon request and payment of the necessary fee.

FIG. 1 illustrates a high-resolution depth image without a continuity with a low-resolution depth image according to example embodiments.

FIG. 1 illustrates an example in which a high-resolution depth image 120 may be generated from a low-resolution depth image 110 based on a similarity between depth values or color values of neighboring pixels, and a weight assigned to a depth value of each pixel. However, when the weight to be assigned to the depth value of the pixel is incorrectly set, the high-resolution depth image 120 without a continuity with the low-resolution depth image 110 may be generated, as illustrated in FIG. 1. In the high-resolution depth image 120, a depth blur may occur between a foreground and a background, in a portion of a border of an object. That is because a depth image having a blurred border may be generated, from the high-color image 130, between the foreground and the background resulting from a color similarity between neighboring pixels. Accordingly, a high-resolution depth image may be generated based on other elements as well as a similarity between color values or depth values of the neighboring pixels.

According to example embodiments, a depth image conversion apparatus may generate a high-resolution discrete depth image where a foreground and a background are discrete, by optimizing an objective function of a discrete depth image, and may generate a high-resolution depth image without a depth blur between the foreground and the background using the generated high-resolution discrete depth image.

Figure 2:
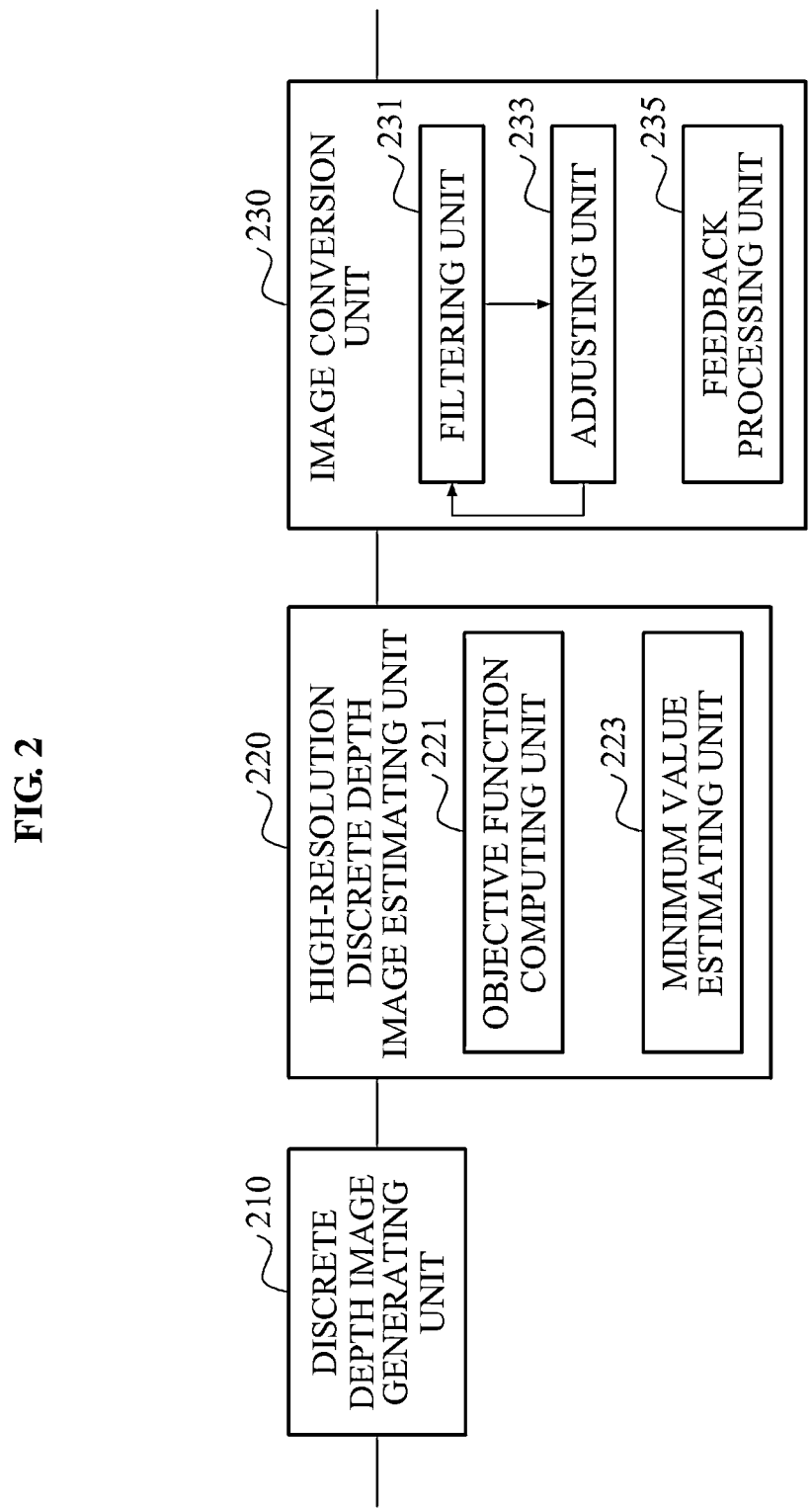
FIG. 2 illustrates a depth image conversion apparatus according to example embodiments.

FIG. 2 illustrates a depth image conversion apparatus according to example embodiments.

Referring to FIG. 2, the depth image conversion apparatus may include a discrete depth image generating unit 210, a high-resolution discrete depth image estimating unit 220, an image conversion unit 230.

The discrete depth image generating unit 210 may generate a discrete depth image by quantizing a depth value of an up-sampled depth image. The up-sampled depth image may be generated through an interpolation of a low-resolution depth image. In this instance, a size of the up-sampled depth image may be identical to a size of a high-resolution depth image. The discrete depth image generating unit 210 may generate the discrete depth image by quantizing depth values of pixels using an integer unit. For example, the discrete depth image generating unit 210 may generate a discrete depth image having a depth value of an integer unit by rounding off depth values of pixels.

The high-resolution discrete depth image estimating unit 220 may estimate a high-resolution discrete depth image by optimizing an objective function of the discrete depth image based on a high-resolution color image and an up-sampled depth border. The high-resolution color image may be input into the depth image conversion apparatus, in conjunction with the low-resolution depth image. The up-sampled depth border may be generated by up-sampling a depth border, extracted from the low-resolution depth image, to a size of the high-resolution color image. The up-sampled depth border may be classified into a border region and a border edge depending on a difference between depth values of neighboring pixels. In the border edge, a difference between depth values of neighboring pixels may be greater than a difference between depth values of neighboring pixels in the border region.

The high-resolution discrete depth image estimating unit 220 may include an objective function computing unit 221, and a minimum value estimating unit 223. The objective function computing unit 221 may compute an objective function reflecting a data cost and a discontinuity cost. In this instance, the data cost may be determined using different schemes depending on the border region of the discrete depth image and the border edge of the discrete depth image. The discontinuity cost may be determined based on a difference between color values of neighboring pixels.

The data cost may be determined based on a color-depth similarity weight between the neighboring pixels so that a difference between a discrete depth value of a pixel and a discrete depth value of a pixel corresponding to the pixel, among pixels in the high-resolution discrete depth image, may be less than a predetermined threshold value in the border region. The color-depth similarity weight may be determined based on a difference between color values of the neighboring pixels, a difference between depth values of the neighboring pixels, and a distance between the neighboring pixels.

The data cost may be determined based on discrete depth values of the neighboring pixels, in the border edge.

The discontinuity cost may be determined based on a difference between color values of the neighboring pixels, and a difference between locations of the neighboring pixels so that a difference between discrete depth values of the neighboring pixels may be modest as well when the difference between the color values of the neighboring pixels is modest.

The objective function may be expressed by Equation 1.

$$F(d) = \sum_i D_i(d_i) + \lambda \sum_{(i,j) \in N} V(d_i, d_j),$$ [Equation 1]

where $F(d)$ denotes an objective function, $D_i(d_i)$ denotes a data cost when a pixel i has a discrete depth value $d_i$ in a high-resolution discrete depth image, and $V(d_i, d_j)$ denotes a discontinuity cost when neighboring pixels i and j have discrete depth values $d_i$ and $d_j$ in the high-resolution discrete depth image, respectively. The pixel i may correspond to a predetermined pixel constituting the high-resolution discrete depth image. The pixel j may correspond to a pixel neighboring the pixel i. A degree of neighboring may refer to a neighboring pixel, or a predetermined pixel distance. A criterion of the degree of neighboring may be determined by a user. $\lambda$ denotes a weight applied to the discontinuity cost, which may be determined by the user.

The data cost may be expressed by Equation 2.

$$D_i(d_i) = \sum_{j \in W_i} w_{i,j} G_j(d_j), \quad \text{[Equation 2]}$$

where $W_i$ denotes a peripheral region including the pixel i. For example, $W_i$ may refer to a window of a predetermined size, the window having the pixel i as the central pixel. j denotes a predetermined pixel included in $W_i$. $w_{i,j}$ denotes a color-depth similarity weight, which may be expressed by Equation 3.

$$w_{i,j} \propto \quad \text{[Equation 3]}$$
$$\exp\left(-\frac{\|c_i - c_j\|^2}{2\sigma_c^2}\right) \exp\left(-\frac{\|z_i^U - z_j^U\|^2}{2\sigma_z^2}\right) \exp\left(-\frac{\|p_i - p_j\|^2}{2\sigma_p^2}\right),$$

where $c_i$ denotes a color value of the pixel i in the high-resolution color image, and $c_j$ denotes a color value of the pixel j in the high-resolution color image. $z_i^U$ denotes a depth value of the pixel i in the up-sampled depth image, and $z_j^U$ denotes a depth value of the pixel j in the up-sampled depth image. $p_i$ denotes image coordinates of the pixel i, and $p_j$ denotes image coordinates of the pixel j. $\sigma_c$ denotes a constant used to convert a difference in a color value to a weight, $\sigma_z$ denotes a constant used to convert a difference in a depth value to a weight, and $\sigma_p$ denotes a constant used to convert a difference in a location of a pixel to a weight. In this instance, $w_{i,j}$ may be determined by applying a Gaussian weight. That is, $w_{i,j}$ may be determined based on a difference between color values of the pixel i and pixel j, a difference between depth values of the pixel i and the pixel j, and a distance between the pixel i and the pixel j.

$G_j(d_j)$ may correspond to a cost that may decrease as well when a difference between a discrete depth value $d_j$ of the pixel j in the high-resolution discrete depth image, and a discrete depth value $d_j^U$ of the pixel j in the discrete depth image decreases. A value of $G_j(d_j)$ may be differently applied to a border region and a border edge. $G_j(d_j)$ may be applied to the border region, as expressed by Equation 4.

$$G_j(d_j) = \begin{cases} (d_j - d_j^U)^2 & \text{if } |d_j - d_j^U| < \Delta d_{th} \\ \Delta d_{th}^2 & \text{otherwise} \end{cases} \quad \text{[Equation 4]}$$

In the border region, different costs may be applied depending on a case in which a difference between $d_j$ and $d_j^U$ is less than a threshold value $\Delta d_{th}$, and a case in which the difference between $d_j$ and $d_j^U$ is greater than the threshold value $\Delta d_{th}$. The threshold value $\Delta d_{th}$ may be determined by the user, and may be proportional to $\lambda$.

$G_j(d_j)$ may be applied to the border edge, as expressed by Equation 5.

$$G_j(d_j) = D_j(d_j) = \begin{cases} 0 & \text{if } d_j = d_j^U \\ 8\lambda & \text{otherwise} \end{cases} \quad \text{[Equation 5]}$$

In the border edge, the cost and the discontinuity cost may have the same value. When $d_j$ and $d_j^U$ have the same value, the cost and the discontinuity cost may correspond to 0. Otherwise, that is, when $d_j$ and $d_j^U$ have difference values, the cost and the discontinuity cost may be determined based on a discrete depth value of a pixel neighboring the pixel i.

The discontinuity cost may be expressed by Equation 6.

$$V(d_i, d_j) = \quad \text{[Equation 6]}$$
$$\begin{cases} 0 & \text{if } |d_i - d_j| < \Delta d_{th2} \\ \dfrac{1}{\|p_i - p_j\|} \exp\left(-\dfrac{\|c_i - c_j\|^2}{2\sigma_c^2}\right) & \text{otherwise,} \end{cases}$$

where $d_i$ and $d_j$ denote discrete depth values of the pixel i and the pixel j that neighbor each other in the high-resolution discrete depth image. When a difference between $d_i$ and $d_j$ is less than a threshold value $\Delta d_{th2}$, the discontinuity cost may correspond to 0 since the difference between discrete depth values of the neighboring pixels may be modest. The threshold value $\Delta d_{th2}$ may be determined by the user. In a case where the difference between $d_i$ and $d_j$ is greater than the threshold value $\Delta d_{th2}$, the discontinuity cost may increase when a difference between color values of the neighboring pixels decreases. When the difference between the color values is modest, the discontinuity cost having a great value may be applied so that the difference between the discrete depth values may be modest as well.

The objective function computing unit 221 may compute an objective function of each pixel included in the discrete depth image based on a data cost and a discontinuity cost.

The minimum value estimating unit 223 may estimate a minimum value of the objective function. The minimum value estimating unit 223 may estimate a discrete depth value of the high-resolution discrete depth image using an algorithm for estimating the minimum value of the objective function when discrete depth values of the pixels neighboring each other in the discrete depth image are discontinuous. For example, the minimum value estimating unit 223 may estimate the minimum value of the objective function using a graph cuts algorithm or a belief propagation algorithm. The discrete depth image generated using the minimum value of the objective function may be estimated to be the high-resolution discrete depth image.

The minimum value estimating unit 223 may obtain the high-resolution discrete depth image where a foreground and a background may be clearly separated, by estimating the minimum value of the objective function.

When a discrete depth value is used in the process of generating the high-resolution discrete depth image, a portion having a discontinuous depth value may be generated although depth values should be continuous in the high-resolution discrete depth image. The image conversion unit 230 may filter the up-sampled depth image based on the high-resolution discrete depth image, and may adjust a depth value of a filtered pixel based on a low-high resolution depth continuity, thereby adjusting the portion having the discontinuous depth value in the high-resolution discrete depth image.

The image conversion unit 230 may convert the up-sampled depth image to a high-resolution depth image by filtering the up-sampled depth image when a difference between discrete depth values of neighboring pixels in the high-resolution discrete depth image is less than a predetermined threshold value.

The image conversion unit 230 may include a filtering unit 231, an adjusting unit 233, and a feedback processing unit 235. The filtering unit 231 may perform filtering by respectively applying different weights to a pixel corresponding to a border region of an up-sampled depth border, and to a pixel corresponding to a border edge and a flat region, in the up-sampled depth image. Here, the flat region may indicate a region where a difference between depth values of neighboring pixels in the low-resolution depth image may be less than a predetermined threshold value.

The filtering unit 231 may apply, to the pixel corresponding to the border region, a weight determined based on a difference between discrete depth values of the neighboring pixel, a difference between color values of the neighboring pixels, a difference between depth values of the neighboring pixels, and a difference between locations of the neighboring pixels.

The filtering unit 231 may apply, to the pixel corresponding to the border edge and the flat region, a weight determined based on a difference between depth values of the neighboring pixels, and a difference between locations of the neighboring pixels.

The filtering process may be expressed by Equation 7.

$$z_i^{(t+1)} = \frac{\sum_{j \in W_i} w_{i,j} z_j^{(t)}}{\sum_{j \in W_i} w_{i,j}} \quad \text{[Equation 7]}$$

When it is assumed that $z_i^{(t)}$ may denote a depth value of the up-sampled depth image, which may be input into the filtering unit 231 at a time t, the filtering unit 231 may generate a depth value $z_i^{(t+1)}$ at a time t+1, by performing a weighted averaging operation. The weighted averaging operation may indicate an operation of multiplying each depth value and a weight, and normalizing a resulting value of the multiplication to be a value of the entire weight. $W_i$ denotes a peripheral region including the pixel i. For example, $W_i$ may refer to a window of a predetermined size, the window having the pixel i as the central pixel. j denotes a predetermined pixel included in $W_i$. The weight may be differently determined depending on a region.

The weight $w_{i,j}$ in the border region may be determined as expressed by Equation 8.

$$w_{i,j} \propto \exp\left(-\frac{\|c_i - c_j\|^2}{2\sigma_c^2}\right)\exp\left(-\frac{\|z_i^U - z_j^U\|^2}{2\sigma_z^2}\right) \quad \text{[Equation 8]}$$
$$\exp\left(-\frac{\|p_i - p_j\|^2}{2\sigma_p^2}\right)\delta(|d_i - d_j| < \Delta d_{th3}),$$

where $c_i$ denotes a color value of the pixel i in the high-resolution color image, and $c_j$ denotes a color value of the pixel j in the high-resolution color image. $z_i^U$ denotes a depth value of the pixel i in the up-sampled depth image, and $z_j^U$ denotes a depth value of the pixel j in the up-sampled depth image. $p_i$ denotes image coordinates of the pixel i, and $p_j$ denotes image coordinates of the pixel j. $d_i$ and $d_j$ denote discrete depth values of the pixel i and the pixel j that neighbor each other in the high-resolution discrete depth image. In the Kronecker Delta Function $\delta$, the weight may correspond to 0 when a difference between $d_i$ and $d_j$ is greater than or equal to a threshold value $\Delta d_{th3}$. That is, the filtering unit 231 may not perform filtering on neighboring pixels having different discrete depth values which are greater than or equal to a threshold value $\Delta d_{th3}$. The threshold value $\Delta d_{th3}$ may be determined by the user. $\sigma_c$ denotes a constant used to convert a difference in a color value to a weight, $\sigma_z$ denotes a constant used to convert a difference in a depth value to a weight, and $\sigma_p$ denotes a constant used to convert a difference in a location of a pixel to a weight. The filtering unit 231 may generate a depth value of the high-resolution depth image based on a difference between color values of the pixel i and the pixel j, a difference between depth values of the pixel i and the pixel j, and a distance between the pixel i and the pixel j when a difference between high-resolution discrete depth values of the pixel i and the pixel j included in the up-sampled depth image is less than a predetermined threshold value.

The weight $w_{i,j}$ in the border edge and the flat region may be determined as expressed by Equation 9.

$$w_{i,j} \propto \exp\left(-\frac{\|z_i^U - z_j^U\|^2}{2\sigma_z^2}\right)\exp\left(-\frac{\|p_i - p_j\|^2}{2\sigma_p^2}\right) \quad \text{[Equation 9]}$$

The filtering unit 231 may generate a depth value of the high-resolution depth image based on a difference between depth values of the pixel i and the pixel j, and a distance between the pixel i and the pixel j.

A high-resolution depth image without a depth blur on a border of the foreground and the background may be generated through the filtering unit 231. The high-resolution depth image generated through the filtering unit 231 may correspond to an image that may not be used for image reconstruction of the low-resolution depth image. When the image reconstruction is guaranteed, an accurate depth image conversion may be performed between the high-resolution depth image and the low-resolution depth image. The adjusting unit 233 may adjust the high-resolution depth image so that the reconstruction may be guaranteed.

The adjusting unit 233 may adjust a depth value of the filtered pixel based on the low-high resolution depth continuity, thereby adjusting a portion having a discontinuous depth value in the high-resolution discrete depth image.

The adjusting unit 233 may adjust the depth value of the filtered pixel based on the low-high resolution depth continuity. The low-high resolution depth continuity may refer to a continuity between a depth value of a predetermined pixel in the high-resolution depth image and a depth value of a pixel, corresponding to the predetermined pixel, in the low-resolution depth image.

The low-high resolution depth continuity may be determined based on a distribution of the low-resolution depth image. In this instance, the distribution of the low-resolution depth image may be determined based on a lens of a photographing device. The distribution of the low-resolution depth image may be determined based on a Point Spread Function (PSF), which may include a uniform distribution, and a Gaussian distribution. The PSF may be determined based on a structure of a sensor included in the photographing device.

The low-high resolution depth continuity may refer to a relationship between a low-resolution pixel, and a corresponding high-resolution pixel. For example, when a low-resolution pixel k is up-sampled by a factor of sixteen, the up-sampled low-resolution pixel k may correspond to sixteen high-resolution pixels. When it is assumed that an average depth value of the sixteen high-resolution pixels may be equal to a depth value of the up-sampled low-resolution pixel k, the low-high resolution depth continuity may be expressed by Equation 10.

$$z_k^L = \sum_{i \in D_k} \frac{1}{16} z_i, \quad \text{[Equation 10]}$$

where $D_k$ denotes a set of high-resolution pixels corresponding to the low-resolution pixel k The adjusting unit 233 may adjust a depth value of a pixel output from the filtering unit 231, by applying the low-high resolution depth continuity. The adjusting unit 233 may determine a reconstruction parameter to be used by the adjusting unit 233, as expressed by Equation 11, and may adjust the depth value of the filtered pixel based on the reconstruction parameter.

$$\Delta z_i^{(t+1)} = z_k^L - \sum_{i \in D_k} \frac{1}{16} z_i^{(t+1)} \quad \text{[Equation 11]}$$

Values input into the adjusting unit 233 may correspond to a depth value $z_i^{(t+1)}$ of a filtered pixel and a reconstruction parameter $\Delta z_i^{(t+1)}$ at a time t+1. $\Delta z_i^{(t+1)}$ may be determined by applying the low-high resolution depth continuity to a depth value output from the filtering unit 231.

The adjusting unit 233 may adjust the depth value $z_i^{(t+1)}$ of the filtered pixel as expressed by Equation 12.

$$z_i^{(t+2)} = z_i^{(t+1)} + \Delta z_i^{(t+1)}$$

The adjusting unit 233 may generate a depth value $z_i^{(t+2)}$ of a new high-resolution depth image at a time t+2, by adjusting the depth value $z_i^{(t+1)}$ of the filtered pixel at the time t+1 using the reconstruction parameter $\Delta z_i^{(t+1)}$.

The feedback processing unit 235 may perform feedback of the pixel of which the depth value is adjusted, by an input value of the filtering unit 231. The feedback processing unit 235 may adjust a discontinuous portion that may occur in the process of generating the high-resolution discrete depth image while maintaining a border of the foreground and the background to be clear through iteration of the filtering and the adjustment. The feedback processing unit 235 may repeat the feedback a predetermined number of times. The feedback processing unit 235 may repeat the feedback until the high-resolution depth image has a predetermined value.

The image conversion unit 230 may simultaneously perform filtering by applying different weights to a pixel corresponding to a border region of the up-sampled depth border, and to a pixel corresponding to a border edge and a flat region, in the up-sampled depth image, and may adjust a depth value of the filtered pixel based on a low-high resolution depth continuity. The image conversion unit 230 may perform the filtering and the adjustment in the same cycle, rather than in different cycles.

Figure 3:
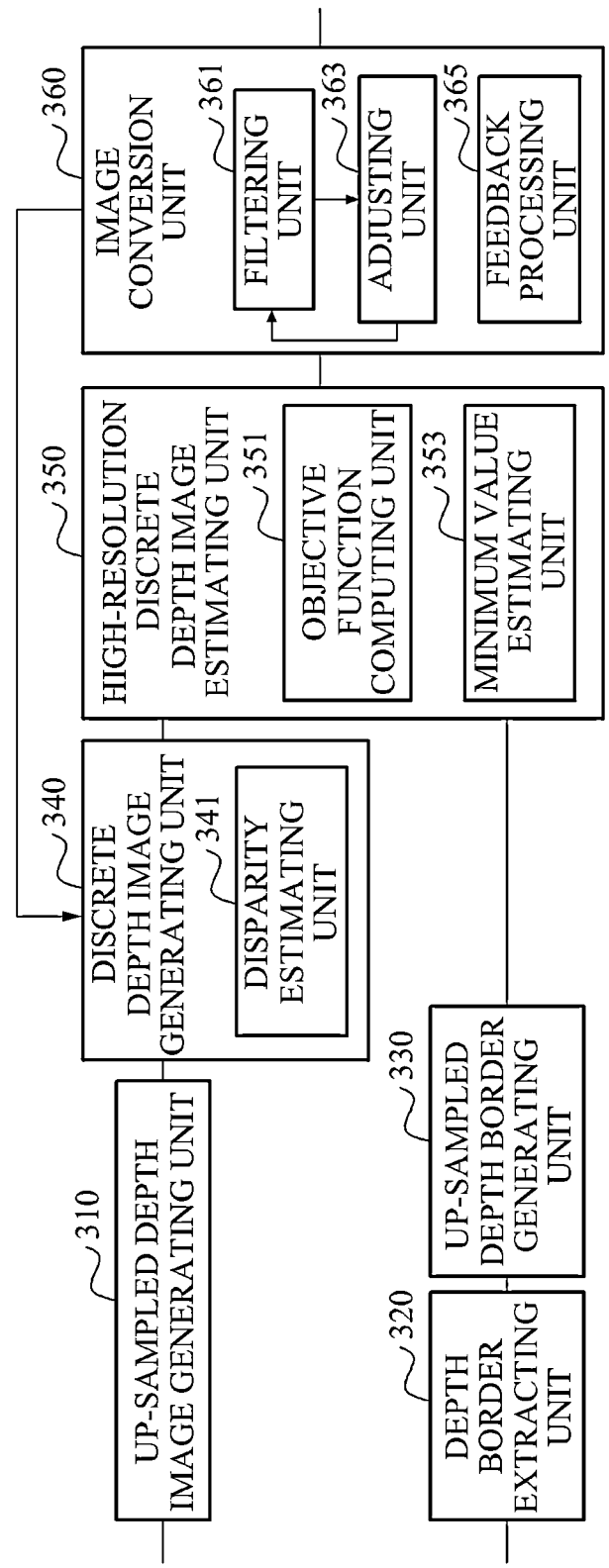
FIG. 3 illustrates another depth image conversion apparatus according to example embodiments.

FIG. 3 illustrates another depth image conversion apparatus according to example embodiments.

Referring to FIG. 3, the depth image conversion apparatus may include an up-sampled depth image generating unit 310, a depth border extracting unit 320, an up-sampled depth border generating unit 330, a discrete depth image generating unit 340, a high-resolution discrete depth image estimating unit 350, and an image conversion unit 360.

A high-resolution color image and a low-resolution depth image may be input into the depth image conversion apparatus.

The up-sampled depth image generating unit 310 may generate an up-sampled depth image through an interpolation of the low-resolution depth image. For example, the up-sampled depth image generating unit 310 may up-sample the low-resolution depth image to be a depth image having a size identical to a size of the high-resolution color image, through a bilinear interpolation or a bicubic interpolation.

The depth border extracting unit 320 may extract neighboring pixels to be a depth border when a difference between depth values of neighboring pixels in the low-resolution depth image is greater than a predetermined threshold value.

The up-sampled depth border generating unit 330 may generate an up-sampled depth border through an interpolation of the extracted depth border. For example, the up-sampled depth border generating unit 330 may generate the up-sampled depth border by performing a nearest neighbor interpolation on a low-resolution depth border.

The up-sampled depth border may include a border region and a border edge that may be classified depending on a difference between depth values of the neighboring pixels. In the border edge, a difference between depth values of the neighboring pixels may be greater than a difference between depth values of the neighboring pixels in the border region.

The discrete depth image generating unit 340 may generate a discrete depth image by quantizing a depth value of the up-sampled depth image.

The discrete depth image generating unit 340 may quantize the depth value through a disparity estimating unit 341. The disparity estimating unit 341 may estimate an integer disparity value that is inversely proportional to the depth value of the up-sampled depth image, and proportional to a baseline length and a focal length between a viewpoint and a virtual viewpoint of the low-resolution depth image. The discrete depth image generating unit 340 may generate a discrete depth image using the integer disparity value as a discrete depth value.

The high-resolution discrete depth image estimating unit 350 may estimate the high-resolution discrete depth image by optimizing an objective function of the discrete depth image based on the high-resolution color image and the up-sampled depth border.

The high-resolution discrete depth image estimating unit 350 may include an objective function computing unit 351, and a minimum value estimating unit 353. The objective function computing unit 351 may compute the objective function reflecting a data cost and a discontinuity cost. In this instance, the data cost may be determined using different schemes depending on the border region of the discrete depth image and the border edge of the discrete depth image. The discontinuity cost may be determined based on a difference between color values of the neighboring pixels.

The minimum value estimating unit 353 may estimate a minimum value of the objective function. The minimum value estimating unit 353 may estimate a discrete depth value of the high-resolution discrete depth image, using an algorithm for estimating the minimum value of the objective function when discrete depth values of the neighboring pixels in the discrete depth image are discontinuous. For example, the minimum value estimating unit 353 may estimate the minimum value of the objective function using a graph cuts algorithm or a belief propagation algorithm.

The image conversion unit 360 may convert the up-sampled depth image to a high-resolution depth image by filtering the up-sampled depth image when a difference between discrete depth values of neighboring pixels in the high-resolution discrete depth image is less than a predetermined threshold value.

The image conversion unit 360 may include a filtering unit 361, an adjusting unit 363, and a feedback processing unit 365. The filtering unit 361 may perform filtering by applying different weights to a pixel corresponding to a border region of the up-sampled depth border, and to a pixel corresponding to a border edge and a flat region, respectively, in the up-sampled depth image.

The filtering unit 361 may apply, to the pixel corresponding to the border region, a weight determined based on a difference between discrete depth values of the neighboring pixel, a difference between color values of the neighboring pixels, a difference between depth values of the neighboring pixels, and a difference between locations of the neighboring pixels. The adjusting unit 363 may adjust the depth value of the filtered pixel based on the low-high resolution depth continuity. The low-high resolution depth continuity may refer to a continuity between a depth value of a predetermined pixel in the high-resolution depth image and a depth value of a pixel, corresponding to the predetermined pixel, in the low-resolution depth image. The low-high resolution depth continuity may show a process of determining the depth value of the predetermined pixel in the low-resolution depth image, based on depth values of corresponding pixels in the high-resolution depth image. The feedback processing unit 365 may perform feedback of the pixel of which the depth value is adjusted, as an input value of the filtering unit 361. The feedback processing unit 365 may adjust a discontinuous portion that may occur in the process of generating the high-resolution discrete depth image while maintaining a border of the foreground and the background to be clear through iteration of the filtering and the adjustment.

Figure 4:
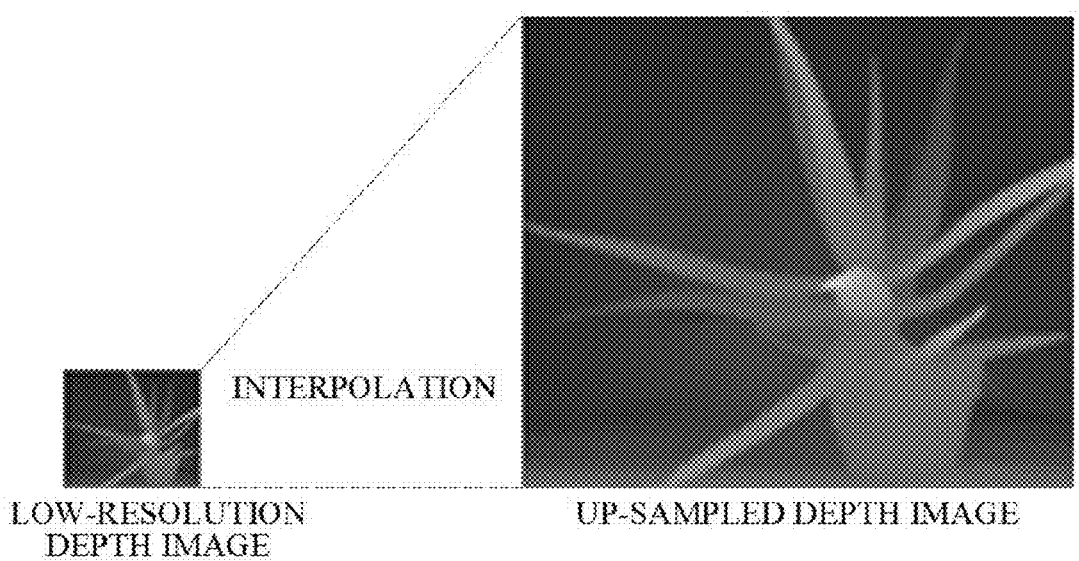
FIG. 4 illustrates an up-sampled depth image generated according to example embodiments.

FIG. 4 illustrates an up-sampled depth image generated according to example embodiments.

A depth image conversion apparatus may generate the up-sampled depth image through an interpolation of a low-resolution depth image. A resolution of the up-sampled depth image may be identical to a resolution of a high-resolution color image. The depth image conversion apparatus may generate the up-sampled depth image from the low-resolution depth image, using an interpolation, for example, a bilinear interpolation, a bicubic interpolation, a nearest neighbor interpolation, and the like.

Figure 5:
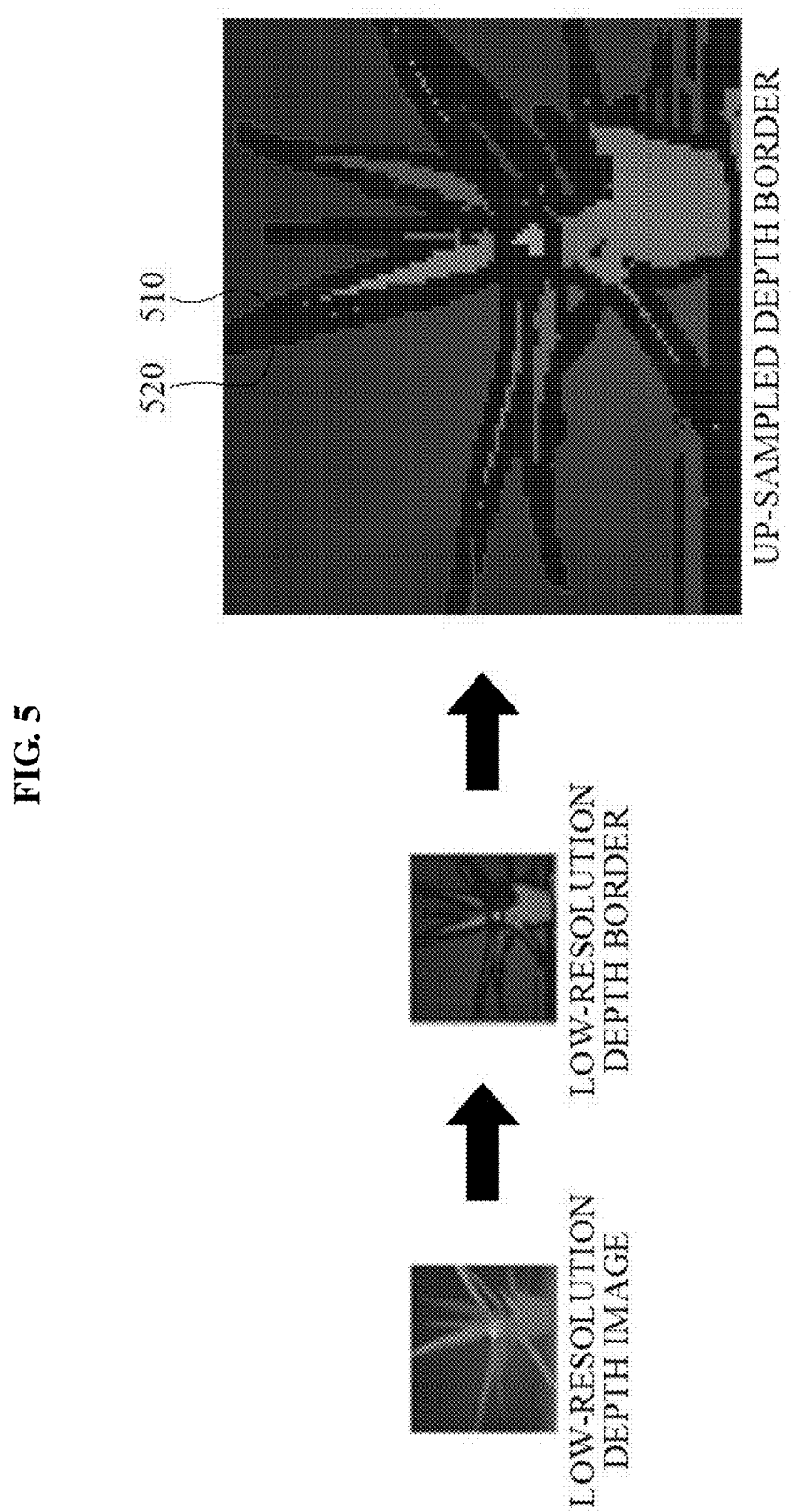
FIG. 5 illustrates an up-sampled depth border generated according to example embodiments.

FIG. 5 illustrates an up-sampled depth border generated according to example embodiments.

Referring to FIG. 5, a depth image conversion apparatus may extract neighboring pixels to be a depth border when a difference between depth values of neighboring pixels in a low-resolution depth image is greater than a predetermined threshold value, since the difference between the depth values of pixels around a depth border may be great. The depth image conversion apparatus may compute a low-resolution depth border through a depth border extracting process, and may generate an up-sampled depth border through an interpolation of the low-resolution depth border. In this instance, the interpolation may correspond to an interpolation scheme used to convert a depth image in image processing, and may include, for example, a bilinear interpolation, a bicubic interpolation, a nearest neighbor interpolation, and the like. The up-sampled depth border may be classified into a border region and a border edge depending on a difference in depth values. In the border edge, a difference between depth values of neighboring pixels may be greater than a difference between depth values of neighboring pixels in the border region. In FIG. 5, the border region may correspond to a region 510, indicated with a blue color. The border edge may correspond to an edge of the border region, a portion 520 indicated with a red color.

Figure 6:
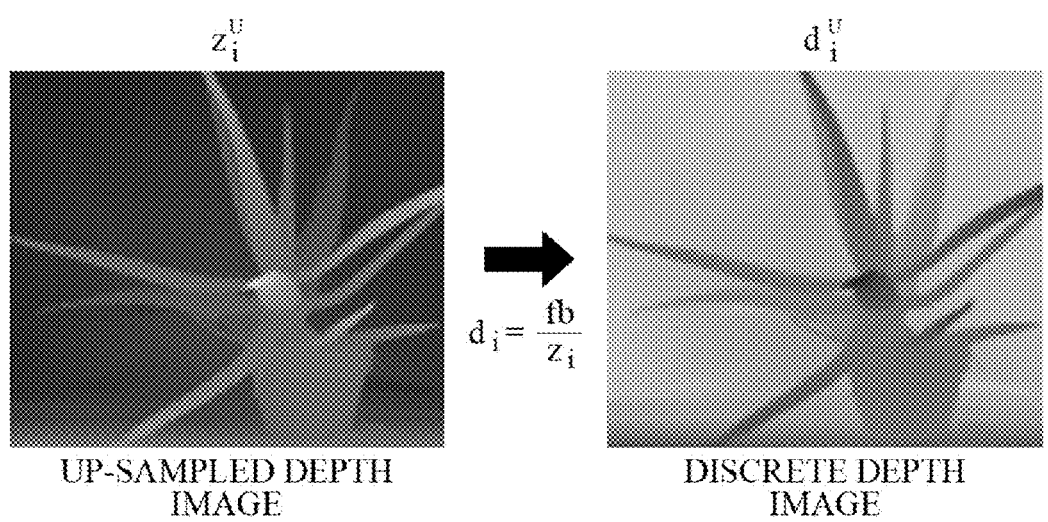
FIG. 6 illustrates a discrete depth image generated according to example embodiments.

FIG. 6 illustrates a discrete depth image generated according to example embodiments.

Referring to FIG. 6, a depth image conversion apparatus may compute an integer disparity value $d_i^U$ that is inversely proportional to a depth value $z_i^U$ of an up-sampled depth image, and proportional to a baseline length b and a focal length f between a viewpoint and a virtual viewpoint of a low-resolution depth image. The depth image conversion apparatus may generate a discrete depth image from the low-resolution depth image, by computing an integer disparity value.

Figure 7:
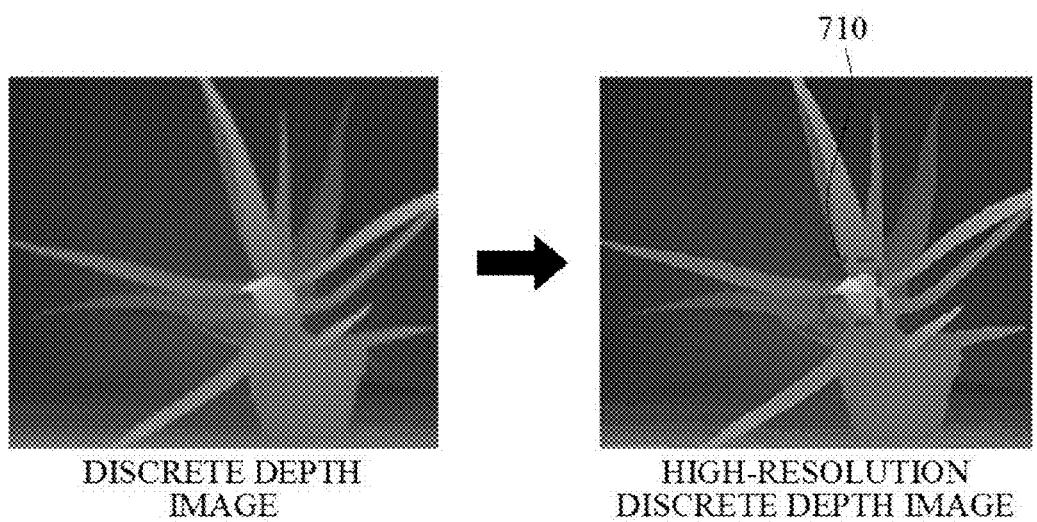
FIG. 7 illustrates a high-resolution discrete depth image generated according to example embodiments.

FIG. 7 illustrates a high-resolution discrete depth image generated according to example embodiments.

A depth image conversion apparatus may compute an objective function reflecting a discrete depth value of a discrete depth image, and may generate a high-resolution discrete depth image when a minimum value of the objective function is estimated. As a result of reflecting the discrete depth value, a border of a foreground and a background in the high-resolution discrete depth image may become clear. However, an artifact having a discontinuous depth value may occur. The depth image conversion apparatus may adjust the artifact based on a reconstruction parameter to reconstruct a low-resolution depth image from a high-resolution depth image.

Figure 8:
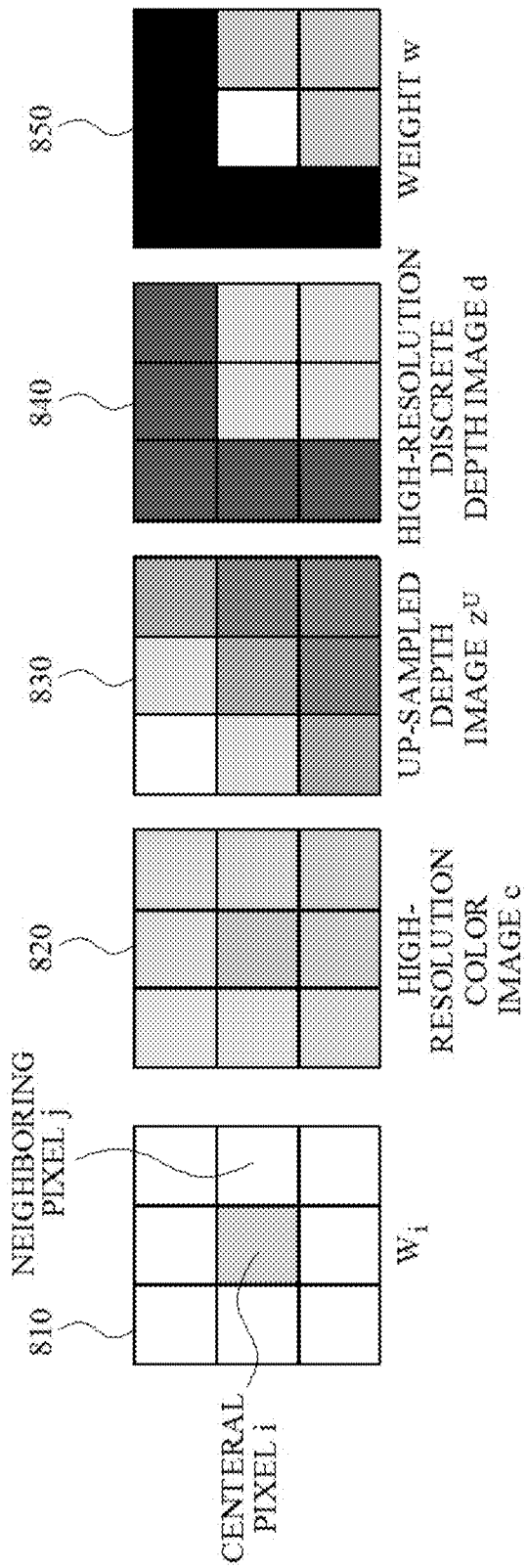
FIG. 8 illustrates elements to be used for filtering according to example embodiments.

FIG. 8 illustrates elements to be used for filtering according to example embodiments.

The elements of FIG. 8 may be applied to determine a weight of filtering, in a filtering process.

$W_i$ 810 may indicate a peripheral region including a pixel i. For example, $W_i$ 810 may refer to a window of a predetermined size, the window having the pixel i as the central pixel. j may indicate a neighboring pixel included in W. c may indicate a color value of a high-resolution color image 820. $z^U$ may indicate a depth value of an up-sampled depth image 830. A low depth value may indicate a short distance from a photographing device, and may be shown using a bright color. d may indicate a discrete depth of a high-resolution discrete depth image 840. The discrete depth may be obtained by quantizing a depth value, and may have a simpler color when compared to a depth image. Accordingly, a border between a foreground and a background may be clearer in the high-resolution discrete depth image 840, when compared to the up-sampled depth image 830. w 850 may indicate a weight. w 850 may be determined based on a difference between depth values of the pixel i and the pixel j, a difference between color values of the pixel i and the pixel j, a difference between locations of the pixel i and the pixel j, and a difference between discrete depth values of the pixel i and the pixel j. A low value of w 850 may be shown using a dark color.

Figure 9:
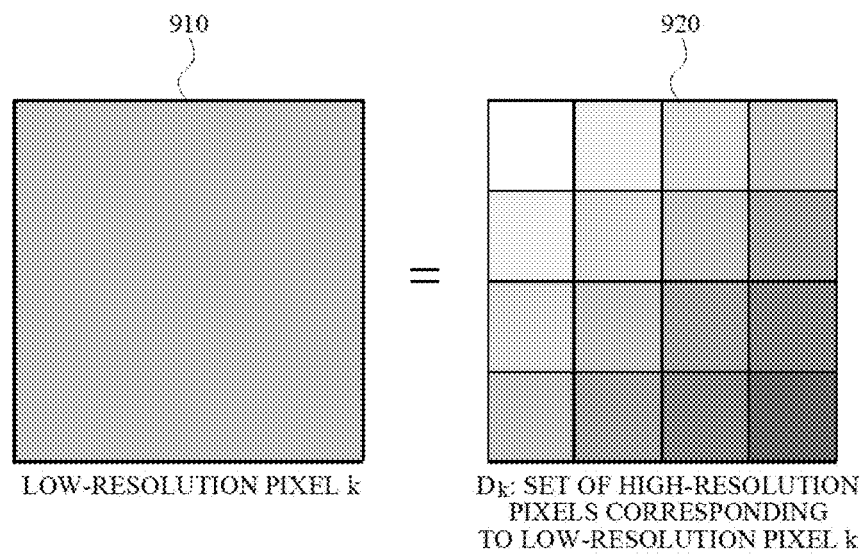
FIG. 9 illustrates a low-high resolution depth continuity according to example embodiments.

FIG. 9 illustrates a low-high resolution depth continuity according to example embodiments.

The low-high resolution depth continuity may refer to a continuity between a depth value of a predetermined pixel in a high-resolution depth image and a depth value of a pixel, corresponding to the predetermined pixel, in a low-resolution depth image. The low-high resolution depth continuity may show a process of determining the depth value of the predetermined pixel in the low-resolution depth image, based on depth values of corresponding pixels in the high-resolution depth image.

Referring to FIG. 9, as an example, when a pixel k 910 included in a low-resolution depth image is converted to a sixteenfold high-resolution depth image, the pixel k 910 may correspond to a set $D_k$ 920 of sixteen pixels included in the high-resolution depth image.

A distribution of the low-resolution depth image may be determined based on a PSF, which may include a uniform distribution, and a Gaussian distribution. When the PSF has the uniform distribution on a pixel coordinate plane, a reconstruction weight may have a constant value of 1/16. The reconstruction weight may refer to a weight to be applied to each pixel included in the high-resolution depth image when the low-resolution depth image is reconstructed from the pixels included in the high-resolution depth image. A reconstruction weight of 1/16 may indicate that an average of depth values of the pixels included in the set $D_k$ 920 of the high-resolution depth image equals a depth value of the pixel k 910 included in the low-resolution depth image.

The reconstruction weight may vary depending on a type of the PSF, and the pixels included in the set $D_k$ 920 of the high-resolution depth image may vary depending on the type of the PSF as well. The PSF may be determined based on a structure of a sensor included in a photographing device.

Figure 10:
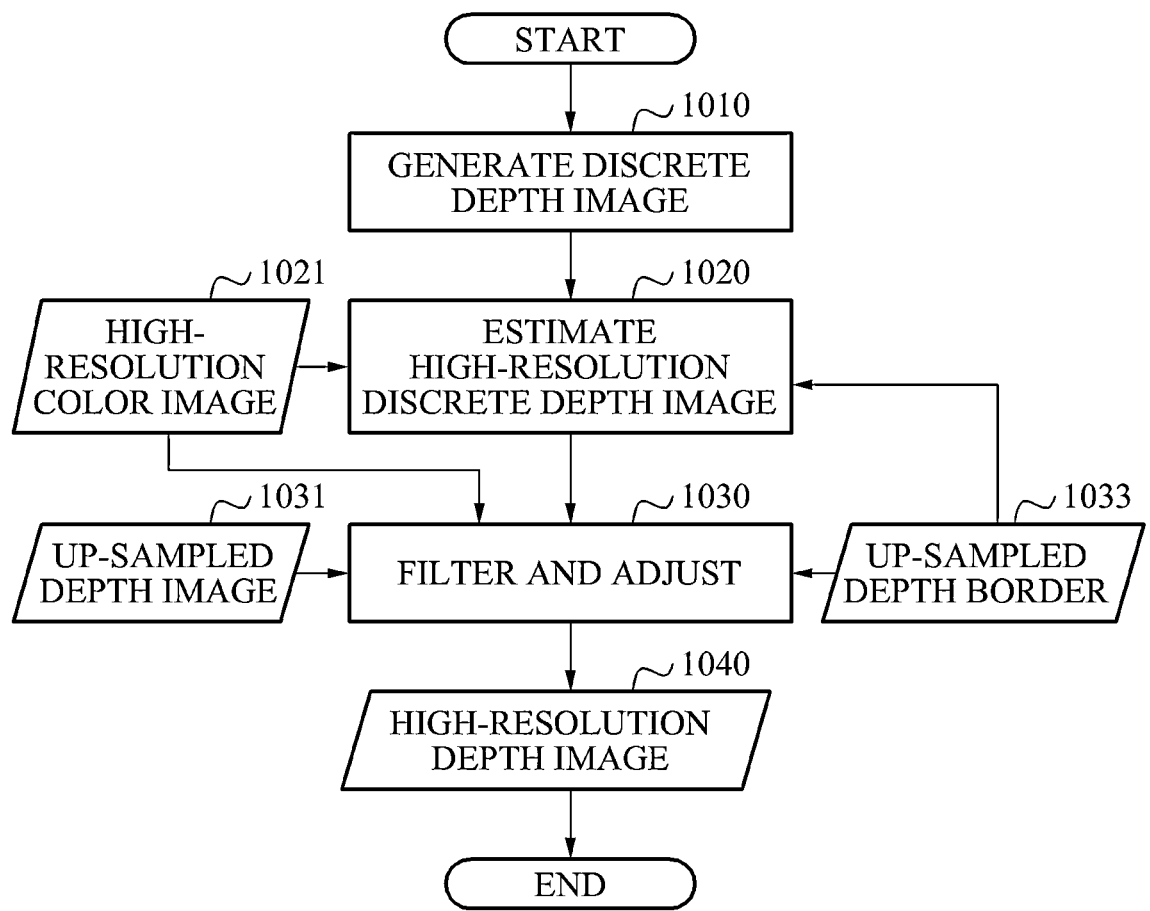
FIG. 10 illustrates a depth image conversion method according to example embodiments.

FIG. 10 illustrates an example of a depth image conversion method according to example embodiments.

In operation 1010, a depth image conversion apparatus may generate a discrete depth image by quantizing a depth value of an up-sampled depth image. In this instance, the quantization may indicate that a depth value of a decimal point unit may be processed to be an integer unit. The up-sampled depth image may be generated through an interpolation of a low-resolution depth image. A resolution of the up-sampled depth image may be identical to a resolution of a high-resolution depth image. The depth image conversion apparatus may generate the discrete depth image from the up-sampled depth image by computing an integer disparity.

In operation 1020, the depth image conversion apparatus may input the discrete depth image, and may estimate a high-resolution discrete depth image by optimizing an objective function based on a high-resolution color image 1021 and an up-sampled depth border 1033. The objective function may reflect a data cost and a discontinuity cost. The data cost may have different values depending on a depth region and a depth edge constituting the up-sampled depth border 1033. In the depth region, the data cost may be determined based on a difference between color values of neighboring pixels, a difference between depth values of the neighboring pixels, and a distance between the neighboring pixels. In the depth edge, the data cost may be determined based on a difference between discrete depth values of the neighboring pixels. A border between a foreground and a background of the depth image may be displayed more clearly by determining the data cost based on the difference between the discrete depth values in the depth edge. The discontinuity cost may be determined based on a difference between color values of the neighboring pixels, and a difference between locations of the neighboring pixels. The discontinuity cost may correspond to a factor that may affect discrete depth values to be similar to each other when the color values of the neighboring pixels are similar.

In operation 1030, the depth image conversion apparatus may convert the up-sampled depth image 1031 to a high-resolution depth image 1040 by filtering corresponding pixels in the up-sampled depth image 1031 when a difference between discrete depth values of the neighboring pixels in the high-resolution discrete depth image is less than a predetermined threshold value. The depth image conversion apparatus may perform the filtering based on the up-sampled depth border 1033 and the high-resolution color image 1021. Also, the depth image conversion apparatus may adjust a discontinuity portion based on the discrete depth value, by adjusting a depth value of the filtered pixel based on a low-high resolution depth continuity.

Figure 11:
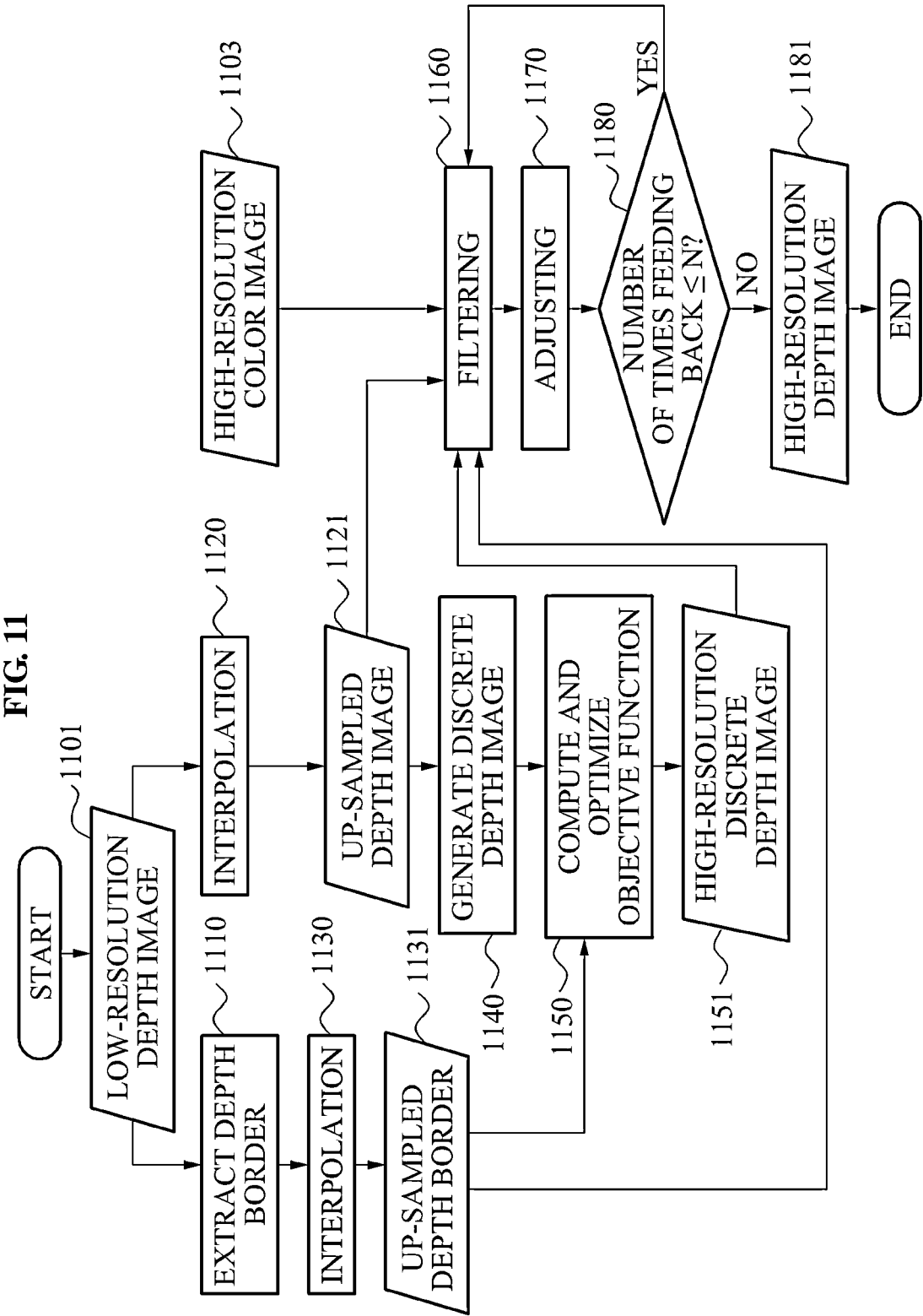
FIG. 11 illustrates a depth image conversion method according to example embodiments.

FIG. 11 illustrates another depth image conversion method according to example embodiments.

In operation 1110, a depth image conversion apparatus may extract neighboring pixels to be a depth border when a difference between depth values of neighboring pixels in a low-resolution depth image 1101 is greater than a predetermined threshold value.

In operation 1120, the depth image conversion apparatus may generate a depth image 1121 up-sampled to a size identical to a size of a high-resolution depth image 1181, through an interpolation of the low-resolution depth image 1101.

In operation 1130, the depth image conversion apparatus may generate an up-sampled depth border 1131 through an interpolation of a depth border. The up-sampled depth border 1131 may include a border region and a border edge that may be classified based on a difference between depth values of neighboring pixels.

In operation 1140, the depth image conversion apparatus may generate a discrete depth image by quantizing a depth value of the up-sampled depth image 1121. The depth image conversion apparatus may estimate an integer disparity value, and may generate a discrete depth image from the up-sampled depth image 1121 using the integer disparity value.

In operation 1150, the depth image conversion apparatus may input the discrete depth image, and may estimate a high-resolution discrete depth image 1151 by computing and optimizing an objective function based on a high-resolution color image 1103, and the up-sampled depth border 1131. A data cost and a discontinuity cost may be applied to the objective function. The data cost may be determined using different schemes depending on a border region or a border edge in the discrete depth image. The data cost may be determined based on a color-depth similarity weight between neighboring pixels in the border region, and may be determined based on discrete depth values of the neighboring pixels in the border edge. The discontinuity cost may be determined based on a difference between color values of the neighboring pixels.

In operation 1160, the depth image conversion apparatus may perform filtering by respectively applying different weights to a pixel corresponding to a border region of the up-sampled depth border 1131, and to a pixel corresponding to a border edge and a flat region, in the up-sampled depth image 1121. The depth image conversion apparatus may apply, to the pixel corresponding to the border region, a weight determined based on a difference between discrete depth values of neighboring pixels in the high-resolution discrete depth image 1151, a difference between color values of neighboring pixels in the high-resolution color image 1103, a difference between depth values of neighboring pixels in the up-sampled depth image 1121, and a difference between locations of the neighboring pixels in the up-sampled depth image 1121. The depth image conversion apparatus may apply, to the pixel corresponding to the border edge and the flat region, a weight determined based on a difference between depth values of neighboring pixels in the up-sampled depth image 1121, and a difference between locations of the neighboring pixels in the up-sampled depth image 1121.

In operation 1170, the depth image conversion apparatus may adjust a depth value of the filtered pixel based on a low-high resolution depth continuity. The low-high resolution depth continuity may refer to a continuity between a depth value of a predetermined pixel in the high-resolution depth image 1181 and a depth value of a pixel, corresponding to the predetermined pixel, in the low-resolution depth image 1101. The low-high resolution depth continuity may show a process of determining the depth value of the predetermined pixel in the low-resolution depth image 1101, based on depth values of corresponding pixels in the high-resolution depth image 1181. The depth image conversion apparatus may reflect, in the high-resolution depth image 1181, a depth value of a subject reflected in the low-resolution depth image 1101, without distortion through the adjustment.

When a number of times feeding back is performed, is less than N in operation 1180, the depth image conversion apparatus may perform feeding back so that a pixel of which the depth value is adjusted may be re-filtered in operation 1160. The depth image conversion apparatus may determine, to be the final high-resolution depth image 1181, a pixel of which the depth value is adjusted when the number of times feeding back is performed, is greater than N. The depth image conversion apparatus may reduce a depth blur occurring between a foreground and a background in the high-resolution depth image 1181, and may reduce a discontinuous portion of the high-resolution depth image 1181 through iteration of the adjustment. Also, the depth image conversion apparatus may generate a discrete depth image by quantizing a depth value of the high-resolution depth image 1181. That is, the depth image conversion apparatus may generate an updated discrete depth image by enabling the high-resolution depth image 1181 to be re-quantized in operation 1140. The depth image conversion apparatus may generate a new high-resolution depth image by repeating processes following operation 1140.

Figure 12:
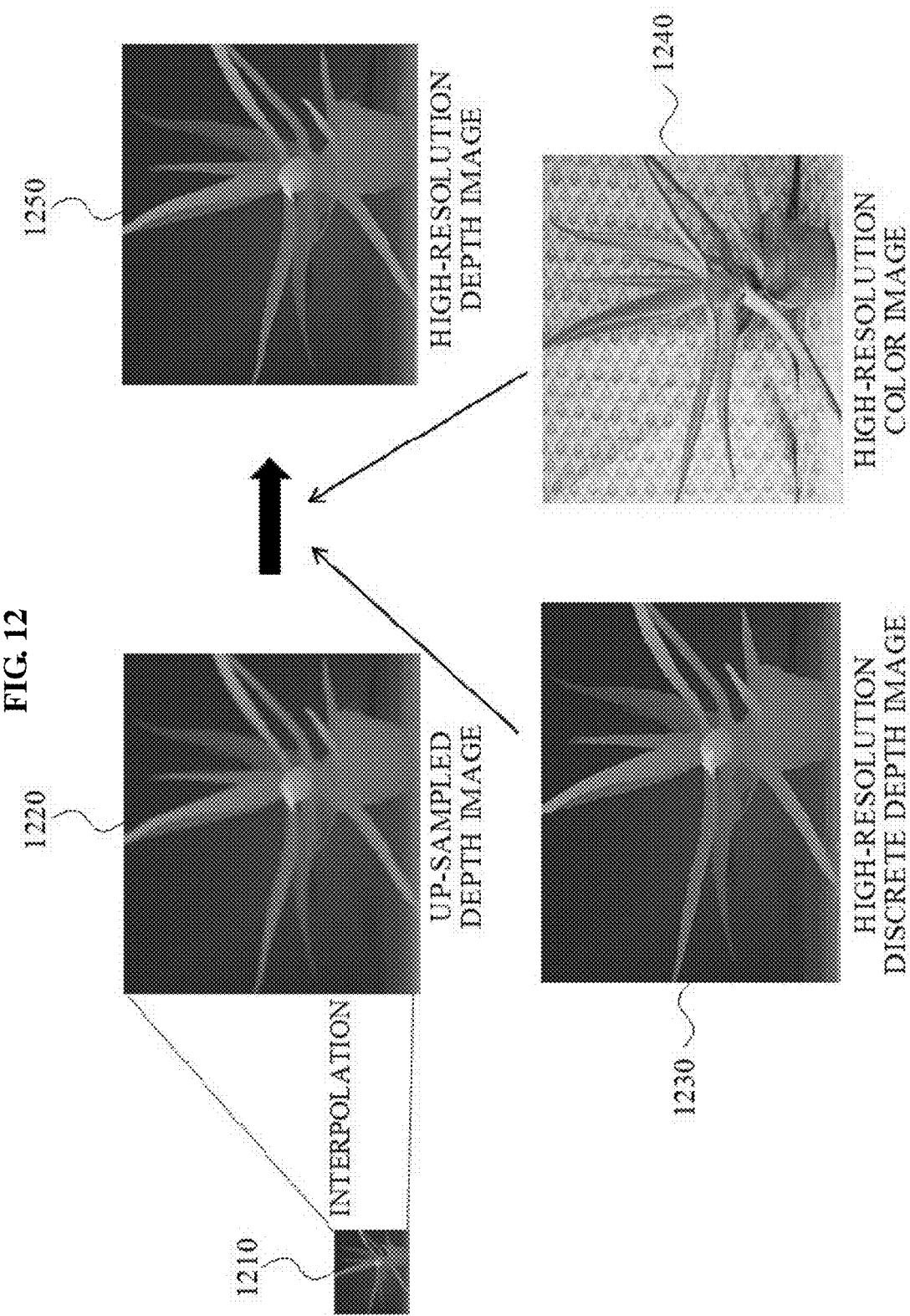
FIG. 12 illustrates a high-resolution depth image converted from a low-resolution depth image according to example embodiments.

FIG. 12 illustrates a high-resolution depth image converted from a low-resolution depth image according to example embodiments.

Referring to FIG. 12, a depth image conversion apparatus may generate an up-sampled depth image 1220 through an interpolation of a low-resolution depth image 1210. In this instance, a resolution of the up-sampled depth image 1220 may be identical to a resolution of a high-resolution depth image 1250. The depth image conversion apparatus may quantize the up-sampled depth image 1220, and may generate a high-resolution discrete depth image 1230 based on a high-resolution color image 1240 and an up-sampled depth border. The depth image conversion apparatus may generate the high-resolution depth image 1250 by filtering the up-sampled depth image 1220 based on the high-resolution discrete depth image 1230 and the high-resolution color image 1240. The depth image conversion apparatus may adjust the filtered depth image based on a relationship between the low-resolution depth image 1210 and the high-resolution depth image 1220. Through the adjustment, the high-resolution depth image 1250 may have a sharper border of a foreground and a background when compared to the up-sampled depth image 1220, and also may display an object photographed in the up-sampled depth 1220 without distortion.

The methods according to the above-described embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the disclosure, or they may be of the kind well-known and available to those having skill in the computer software arts.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for converting a depth image, the apparatus comprising:
    a discrete depth image generating unit to generate a discrete depth image by quantizing a depth value of an up-sampled depth image;
    a high-resolution discrete depth image estimating unit to estimate a high-resolution discrete depth image by optimizing an objective function of the discrete depth image based on a high-resolution color image and an up-sampled depth border; and
    an image conversion unit to convert the up-sampled depth image to a high-resolution depth image by filtering the up-sampled depth image when a difference between discrete depth values of neighboring pixels in the high-resolution discrete depth image is less than a predetermined threshold value.

2. The apparatus of claim 1, further comprising:
    an up-sampled depth image generating unit to generate the up-sampled depth image to a size identical to a size of the high-resolution depth image through an interpolation of a low-resolution depth image;
    a depth border extracting unit to extract neighboring pixels to be a depth border when a difference between depth values of neighboring pixels in the low-resolution depth image is greater than a predetermined threshold value; and
    an up-sampled depth border generating unit to generate the up-sampled depth border through an interpolation of the depth border.

3. The apparatus of claim 1, wherein
    the discrete depth image generating unit comprises:
    a disparity estimating unit to estimate an integer disparity value that is inversely proportional to a depth value of the up-sampled depth image, and proportional to a baseline length and a focal length between a viewpoint and a virtual viewpoint of a low-resolution depth image, and
    the discrete depth image generating unit uses the integer disparity value as a discrete depth value of the discrete depth image.

4. The apparatus of claim 1, wherein
    the high-resolution discrete depth image estimating unit comprises:
    an objective function computing unit to compute the objective function reflecting a data cost determined using different schemes depending on a border region of the discrete depth image and a border edge of the discrete depth image, and a discontinuity cost determined based on a difference between color values of the neighboring pixels; and
    a minimum value estimating unit to estimate a minimum value of the objective function.

5. The apparatus of claim 1, wherein the up-sampled depth border comprises a border region and a border edge that are classified based on a difference between depth values of neighboring pixels.

6. The apparatus of claim 4, wherein
    the data cost is determined based on a color-depth similarity weight between the neighboring pixels so that a difference between a discrete depth value of a pixel and a discrete depth value of a pixel corresponding to the pixel, among pixels in the high-resolution discrete depth image, may be less than a predetermined threshold value in the border region, and the data cost is determined based on discrete depth values of the neighboring pixels, in the border edge.

7. The apparatus of claim 6, wherein the color-depth similarity weight is determined based on a difference between color values of the neighboring pixels, a difference between depth values of the neighboring pixels, and a distance between the neighboring pixels.

8. The apparatus of claim 4, wherein the discontinuity cost is determined based on a difference between color values of the neighboring pixels, and a difference between locations of the neighboring pixels so that a difference between discrete depth values of the neighboring pixels may also be modest when the difference between the color values of the neighboring pixels is modest.

9. The apparatus of claim 4, wherein the minimum value estimating unit estimates a discrete depth value of the high-resolution discrete depth image, using an algorithm for estimating the minimum value of the objective function when discrete depth values of the neighboring pixels are discontinuous.

10. The apparatus of claim 1, wherein the image conversion unit comprises:
a filtering unit to perform filtering by respectively applying different weights to a pixel corresponding to a border region of the up-sampled depth border, and to a pixel corresponding to a border edge and a flat region, in the up-sampled depth image.

11. The apparatus of claim 10, wherein
the filtering unit applies, to the pixel corresponding to the border region, a weight determined based on a difference between discrete depth values of the neighboring pixels, a difference between color values of the neighboring pixels, a difference between depth values of the neighboring pixels, and a difference between locations of the neighboring pixels, and
the filtering unit applies, to the pixel corresponding to the border edge and the flat region, a weight determined based on a difference between depth values of neighboring pixels, and a difference between locations of the neighboring pixels.

12. The apparatus of claim 10, wherein the image conversion unit further comprises:
an adjusting unit to adjust a depth value of the filtered pixel based on a low-high resolution depth continuity.

13. The apparatus of claim 12, wherein the low-high resolution depth continuity corresponds to a continuity between the depth value of the filtered pixel, and a depth value of a pixel, corresponding to the filtered pixel, in a low-resolution depth image.

14. The apparatus of claim 12, wherein the image conversion unit further comprises:
a feedback processing unit to feed back the pixel of which the depth value is adjusted, as an input value of the filtering unit.

15. The apparatus of claim 1, wherein the image conversion unit simultaneously performs filtering by applying different weights to a pixel corresponding to a border region of the up-sampled depth border, and to a pixel corresponding to a border edge and a flat region, in the up-sampled depth image, and adjusts a depth value of the filtered pixel based on a low-high resolution depth continuity.

16. A method of converting a depth image, the method comprising:
generating a discrete depth image by quantizing a depth value of an up-sampled depth image;
estimating a high-resolution discrete depth image by inputting the discrete depth image, and optimizing an objective function of the discrete depth image based on a high-resolution color image and an up-sampled depth border; and
converting the up-sampled depth image to a high-resolution depth image by filtering the up-sampled depth image when a difference between discrete depth values of neighboring pixels in the high-resolution discrete depth image is less than a predetermined threshold value.

17. The method of claim 16, further comprising:
generating the up-sampled depth image to a size identical to a size of the high-resolution depth image through an interpolation of a low-resolution depth image;
extracting neighboring pixels to be a depth border when a difference between depth values of neighboring pixels in the low-resolution depth image is greater than a predetermined threshold value; and
generating the up-sampled depth border through an interpolation of the depth border.

18. The method of claim 16, wherein
the generating of the discrete depth image comprises estimating an integer disparity value that is inversely proportional to a depth value of the up-sampled depth image, and proportional to a baseline length and a focal length between a viewpoint and a virtual viewpoint of a low-resolution depth image, and
the integer disparity value is used as a discrete depth value of the discrete depth image.

19. The method of claim 16, wherein
the up-sampled depth border comprises a border region and a border edge that are classified based on a difference between depth values of neighboring pixels, and
the estimating of the high-resolution discrete depth image comprises:
computing the objective function reflecting a data cost determined using different schemes depending on the border region of the discrete depth image and the border edge of the discrete depth image, and a discontinuity cost determined based on a difference between color values of the neighboring pixels; and
estimating a minimum value of the objective function.

20. The method of claim 19, wherein
the data cost is determined based on a color-depth similarity weight between the neighboring pixels so that a difference between a discrete depth value of a pixel and a discrete depth value of a pixel corresponding to the pixel, among pixels in the high-resolution discrete depth image, may be less than a predetermined threshold value in the border region, and
the data cost is determined based on discrete depth values of the neighboring pixels, in the border edge.

21. The method of claim 20, wherein the color-depth similarity weight is determined based on a difference between color values of the neighboring pixels, a difference between depth values of the neighboring pixels, and a distance between the neighboring pixels.

22. The method of claim 19, wherein the discontinuity cost is determined based on a difference between color values of the neighboring pixels, and a difference between locations of the neighboring pixels so that a difference between discrete depth values of the neighboring pixels may also be modest when the difference between the color values of the neighboring pixels is modest.

23. The method of claim 16, wherein the converting comprises:
performing filtering by respectively applying different weights to a pixel corresponding to a border region of the up-sampled depth border, and to a pixel corresponding to a border edge and a flat region, in the up-sampled depth image.

24. The method of claim 16, wherein the performing of the filtering comprises:
applying, to the pixel corresponding to the border region, a weight determined based on a difference between discrete depth values of the neighboring pixels, a difference between color values of the neighboring pixels, a difference between depth values of the neighboring pixels, and a difference between locations of the neighboring pixels, and
applying, to the pixel corresponding to the border edge and the flat region, a weight determined based on a difference between depth values of neighboring pixels, and a difference between locations of the neighboring pixels.

25. The method of claim 23, wherein the converting further comprises adjusting a depth value of the filtered pixel based on a low-high resolution depth continuity.

26. The method of claim 16, wherein the generating of the discrete depth image comprises generating a discrete depth image by quantizing a depth value of the high-resolution depth image.

* * * * *